(12) United States Patent
Huang (10) Patent No.: US 9,700,176 B2
(45) Date of Patent: Jul. 11, 2017

(54) FOOD PROCESSING MACHINE CONFIGURED FOR OMNIBEARING STIRRING

(71) Applicant: Jiangmen Kingfai Electrical Appliance Ind. Co., Ltd, Jiangmen (CN)

(72) Inventor: Zhijian Huang, Jiangmen (CN)

(73) Assignee: Jiangmen Kingfai Electrical Appliance Ind. Co., Ltd., Jiangmen (CN)

( * ) Notice: Subject to any disclaimer, the term of this patent is extended or adjusted under 35 U.S.C. 154(b) by 190 days.

(21) Appl. No.: 14/669,118

(22) Filed: Mar. 26, 2015

(65) Prior Publication Data
US 2016/0073826 A1    Mar. 17, 2016

(30) Foreign Application Priority Data

Sep. 11, 2014  (CN) .................... 2014 2 0521431 U (51) Int. Cl.
*A47J 43/00*  (2006.01)
*A47J 43/044*  (2006.01)
*A47J 43/08*  (2006.01)

(52) U.S. Cl.
CPC .......... *A47J 43/044* (2013.01); *A47J 43/082* (2013.01); *A47J 2043/04463* (2013.01); *A47J 2043/04481* (2013.01)

(58) Field of Classification Search
CPC ... A21C 1/1405; A47J 43/288; A47J 43/1006; A47J 43/1012; A47J 43/105; A47J 43/0705; A47J 43/0711; A47J 43/044; A47J 43/082; A47J 2043/04481; A47J 2043/04463
USPC .......................... 366/197, 202, 216, 234, 276
See application file for complete search history.

(56) References Cited

U.S. PATENT DOCUMENTS

| | | | | |
|---|---|---|---|---|
| 1,656,665 A * | 1/1928 | Dehuff | ...................... | B01F 7/30 366/197 |
| 5,524,530 A * | 6/1996 | Nijzingh | ............... | A47J 43/085 241/37.5 |
| 5,911,505 A * | 6/1999 | St. John | ................... | A21C 1/02 366/200 |
| 7,306,362 B2 * | 12/2007 | Lim | ...................... | A47J 43/082 366/201 |

* cited by examiner

*Primary Examiner* — Tony G Soohoo
*Assistant Examiner* — Anshu Bhatia
(74) *Attorney, Agent, or Firm* — LeonardPatel PC

(57) ABSTRACT

A food processing machine capable of omnibearing stirring is provided. The food processing machine may include an L-shaped machine body, a cup, an opening-and-closing arm and a machine head having a built-in motor. The food processing machine may have a relatively small size, a more effective structure, and good stability relative to conventional food processing machines. The structure of the food processing machine may also use less power.

11 Claims, 11 Drawing Sheets

FOOD PROCESSING MACHINE CONFIGURED FOR OMNIBEARING STIRRING

CROSS REFERENCE TO RELATED APPLICATION

This application claims the benefit of Chinese Utility Model Application No. 201420521431.8, filed Sep. 11, 2014. The subject matter of this earlier filed patent application is hereby incorporated by reference in its entirety.

FIELD

The present invention generally relates to food processing, and in particular, to a food processing machine configured for omnibearing stirring.

BACKGROUND

Food processing machines, for example, a flour mixing machine, an egg-breaking machine, and the like, typically comprise an L-shaped machine body, as well as a machine head and a cup mounted on the L-shaped machine body. A rotating member driven by a motor for stirring food within the cup is arranged on the machine head. In order to affect omnibearing stirring of the rotating member in the cup, a food processing machine with a machine head capable of oscillation has been developed. However, the food processing machine is provided with a plurality of power sources for driving the rotation of the rotating member and the cup as well as the oscillation of the machine head, respectively, leading to a large size and complicated control. Meanwhile, the arrangement of a transmission device of the food processing machine causes the machine head to be relatively heavy while the L-shaped machine body is relatively light, leading to poor stability.

SUMMARY

Certain embodiments of the present invention may provide solutions to the problems and needs in the art that have not yet been fully identified, appreciated, or solved by current food processing machines. For example, some embodiments of the present invention provide a food processing machine configured for omnibearing stirring. The food processing machine may have a relatively small size, a more effective structure, and good stability.

In an embodiment, a food processing machine configured for omnibearing stirring includes an L-shaped machine body. A rotatable cup is arranged at a lower end of the L-shaped machine body, and an opening-and-closing arm capable of up-and-down rotation is pivotally mounted at an upper end of the L-shaped machine body. The opening-and-closing arm is mounted with a built-in motor and a machine head capable of left and right oscillation relative to the opening-and-closing arm, one end of the machine head is provided with a rotating member driven by the motor and extending into the cup for stirring the food, and the machine head is mounted on the opening-and-closing arm by means of a transmission case which is provided with a first transmission mechanism driven by the motor in its interior. The first transmission mechanism includes an oscillating gear and a fixed gear in engagement with the oscillating gear. A rotation shaft of the fixed gear is removably connected with a transmission shaft at the lower end, the lower end of the transmission shaft is fixed on the L-shaped machine body, a turnplate which is brought into rotation by the transmission shaft via a second transmission mechanism is connected below the cup, and the second transmission mechanism is arranged in the L-shaped machine body. A rotation shaft of the oscillating gear is secured on the transmission case at both ends, a lower end face of the oscillating gear is eccentrically provided with a bump, an upper end of the opening-and-closing arm is provided with a cover plate having a linear groove, and the bump extends out of the transmission case and cooperates with the linear groove so as to allow the oscillating gear to drive the transmission case to oscillate left and right around the fixed gear.

In certain embodiments, the first transmission mechanism further includes a transmission component arranged between the rotating member and the fixed gear for power transmission, and the transmission component and the oscillating gear are arranged at two different sides of the fixed gear, respectively.

In some embodiments, the transmission component includes a gear transmission mechanism, a belt transmission mechanism, or a chain transmission mechanism. In certain embodiments the transmission component is a gear transmission mechanism, a drive gear is arranged on the rotating member, and the transmission component is provided with a gear in engagement with the drive gear. In some embodiments, the second transmission mechanism includes a gear transmission mechanism, a belt transmission mechanism, or a chain transmission mechanism.

In some embodiments, the second transmission mechanism includes a gear transmission mechanism that includes a gear ring located at the lower end of the turnplate and formed integrally therewith. In certain embodiments, the rotation shaft of the fixed gear is connected with the transmission shaft via clutch teeth.

In some embodiments, an oscillation guiding mechanism is arranged between the transmission case and the cover plate, and includes an L-shaped sliding block and an arc-shaped sliding chute in sliding fit with the sliding block. The arc-shaped sliding chute is centered on the axis of the fixed gear and is provided with an entering groove for ease of entering the sliding block at one end.

In some embodiments, three sets of oscillation guiding mechanisms are provided, and the arc-shaped sliding chute includes two transverse arc-shaped sliding chutes arranged in the upper end face of the cover plate and a longitudinal arc-shaped sliding chute arranged in side of a bottom shell of the transmission case. The two transverse arc-shaped sliding chutes are positioned at two different sides of the fixed gear respectively, the sliding block includes two first sliding blocks positioned on the bottom shell of the transmission case and a second sliding block positioned on the upper end face of the cover plate, the two first sliding blocks are in sliding fit with the two transverse arc-shaped sliding chutes respectively, and the second sliding block is in sliding fit with the longitudinal arc-shaped sliding chute.

In some embodiments, two rotating members are provided, an output shaft of the motor is connected with a worm, and two ends of the worm are connected with worm wheels that are connected with the rotating members. In certain embodiments, the cup is provided with a bottom edge at its lower end, an inner side of the bottom edge is provided with a convex buckle, and the turnplate is provided with a rotating groove rotatingly buckled with the convex buckle.

Some embodiments have certain benefits over conventional food processors. The rotating member may be driven by the motor in the machine head, and the first transmission mechanism may be driven by the motor to rotate the fixed gear and oscillating gear that are engaged with each other. In some embodiments, as the rotation shaft of the fixed gear is connected with the L-shaped machine body via the transmission shaft, the oscillating gear revolves around the fixed gear, and as the bump on the oscillating gear is guided and constrained by the linear groove in the opening-and-closing arm, the transmission case is brought into left and right oscillation relative to the opening-and-closing arm by the rotation shaft of the oscillating gear, causing the machine head mounted on the transmission case to oscillate left and right relative to the opening-and-closing arm, and enabling the oscillation of the rotating member. The turnplate may be brought into rotation by the transmission shaft via the second transmission mechanism, allowing the cup connected to the turnplate to rotate. According to certain embodiments, simultaneous self-rotation of the rotating member, oscillation of the machine head, and rotation of the cup may be achieved by one motor. Such a food processing machine may be relatively small in size and simple to control. Moreover, the first transmission mechanism and the second transmission mechanism may be positioned at the upper and lower ends of the food processing machine, respectively. The transmission mechanism represents a more effective design, avoiding the problem that the machine is top-heavy as the transmission mechanism is centralized at the upper part of the machine. This also provides good stability.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
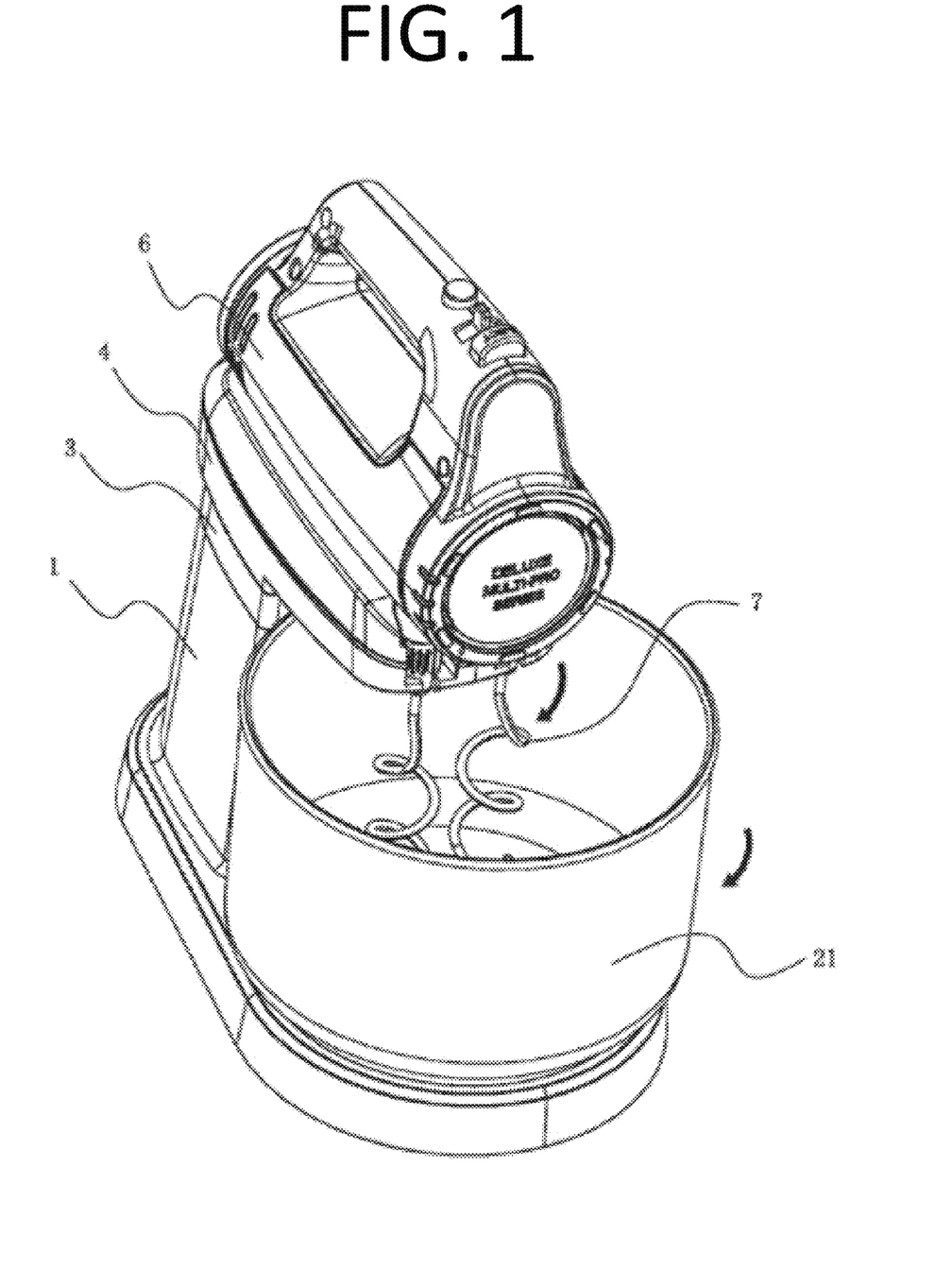
FIG. 1 is a perspective view of a food processor, according to an embodiment of the present invention.
Figure 2:
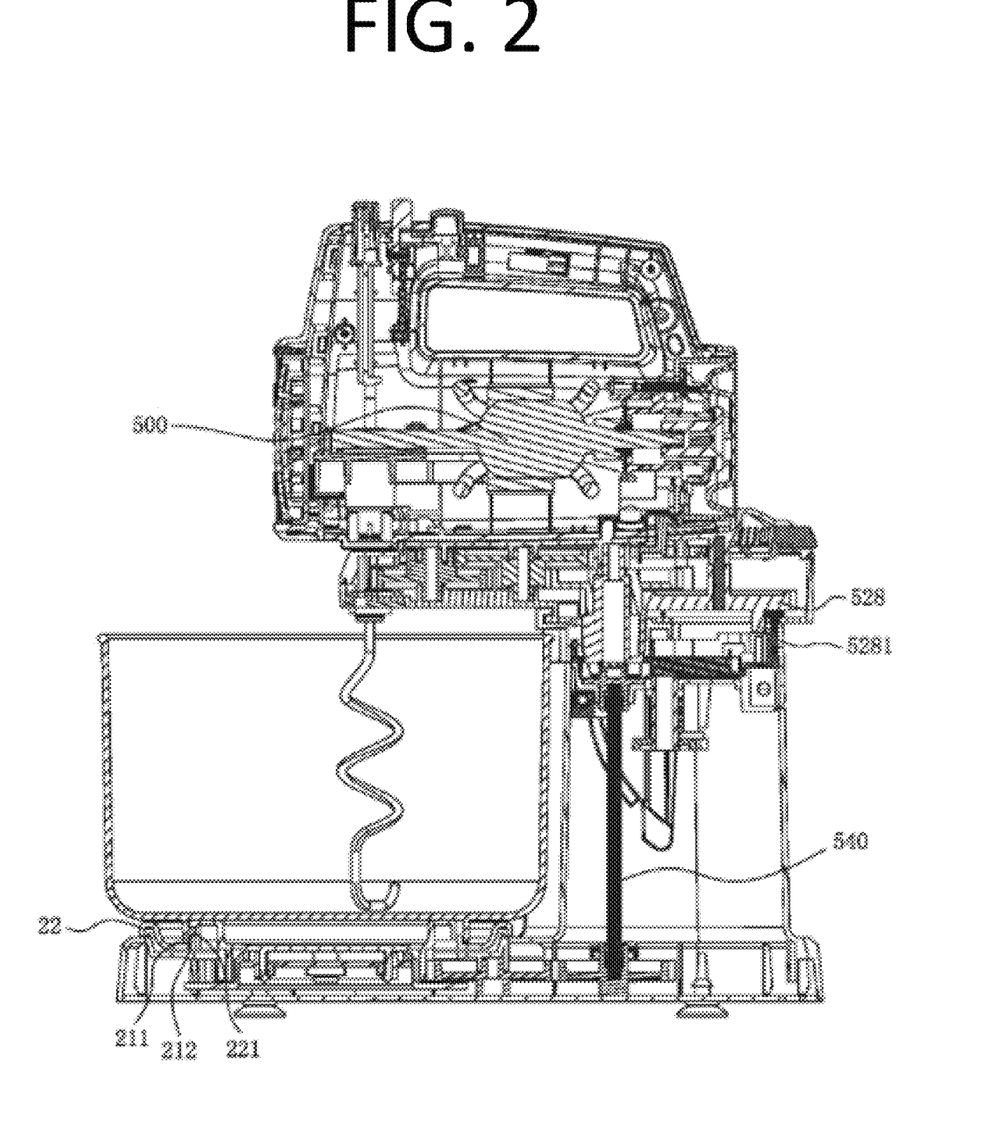
FIG. 2 is a side cutaway view of the food processor, according to an embodiment of the present invention.
Figure 3:
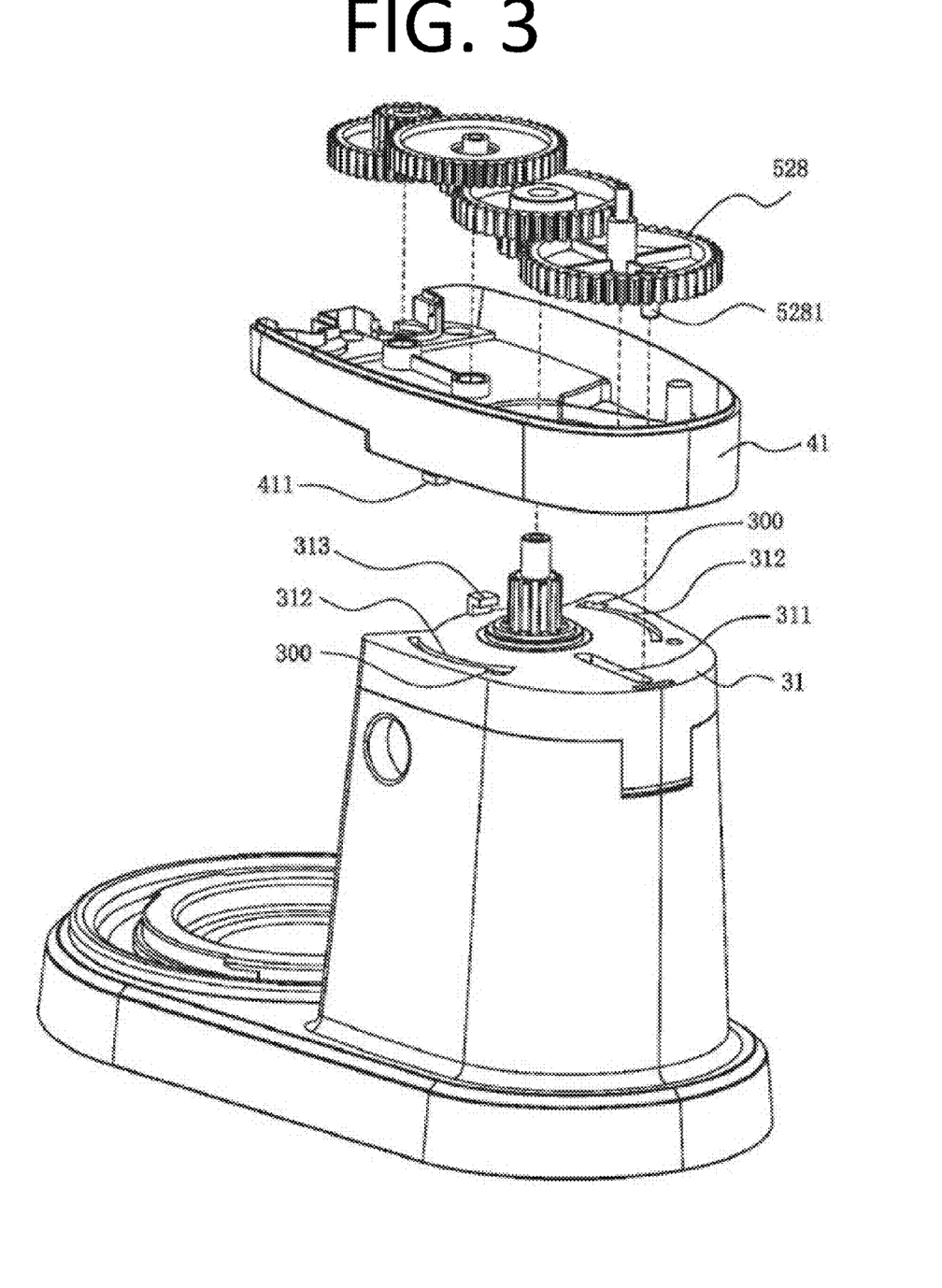
FIG. 3 is an exploded view of the food processor with some parts removed, according to an embodiment of the present invention.
Figure 4:
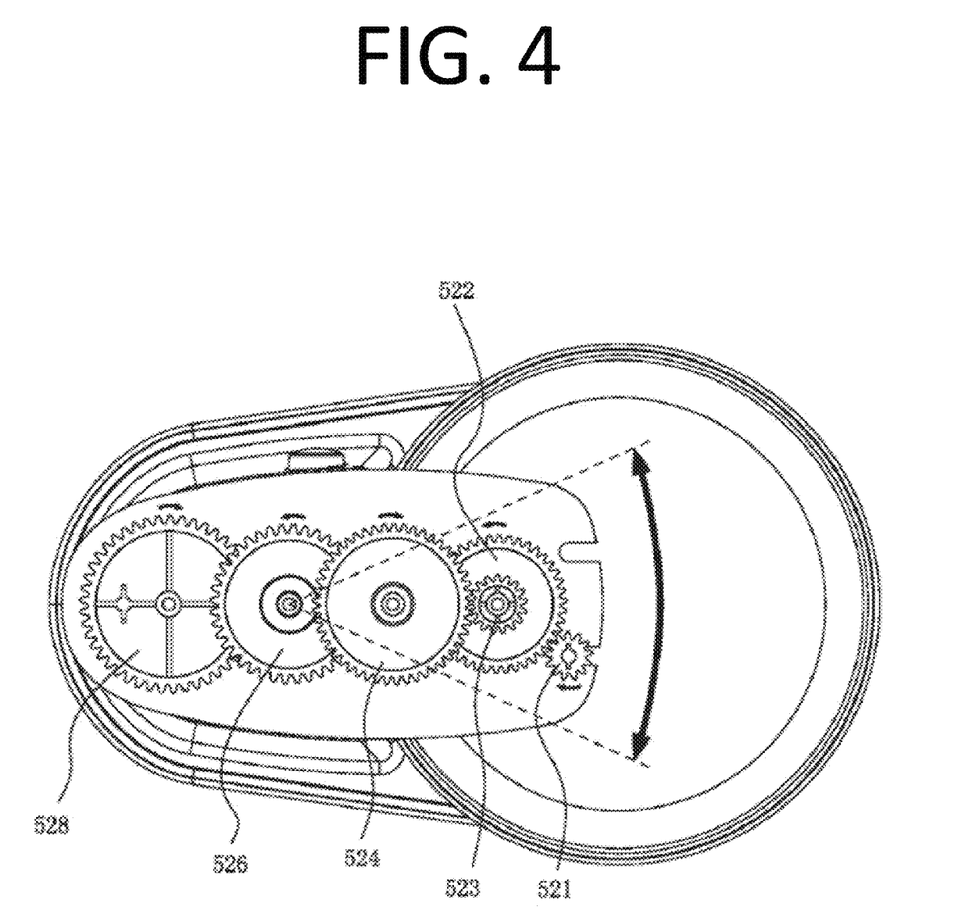
FIG. 4 is a top view of the food processor with some parts removed, according to an embodiment of the present invention.
Figure 5:
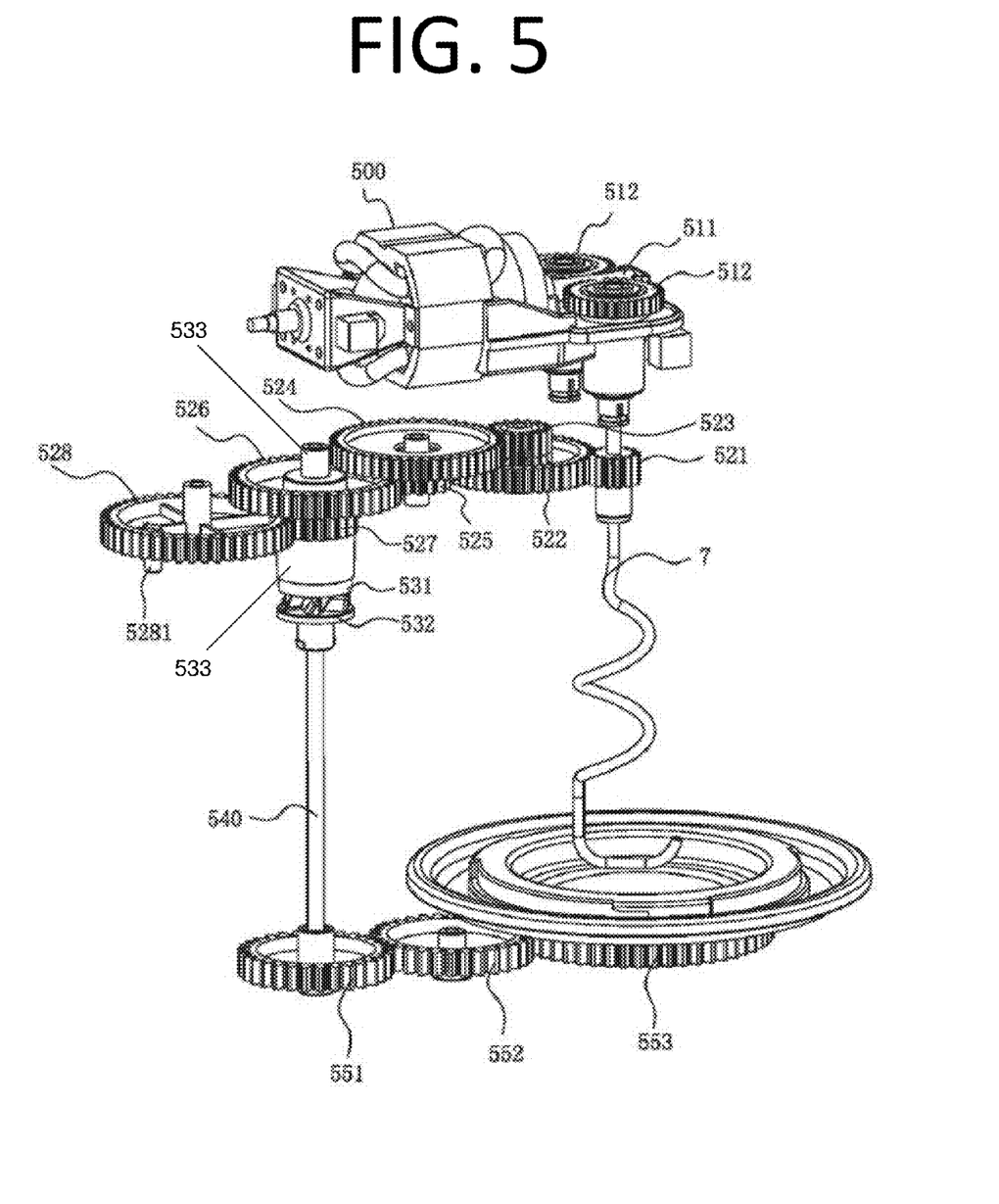
FIG. 5 illustrates a transmission mechanism of the food processor, according to an embodiment of the present invention.
Figure 6:
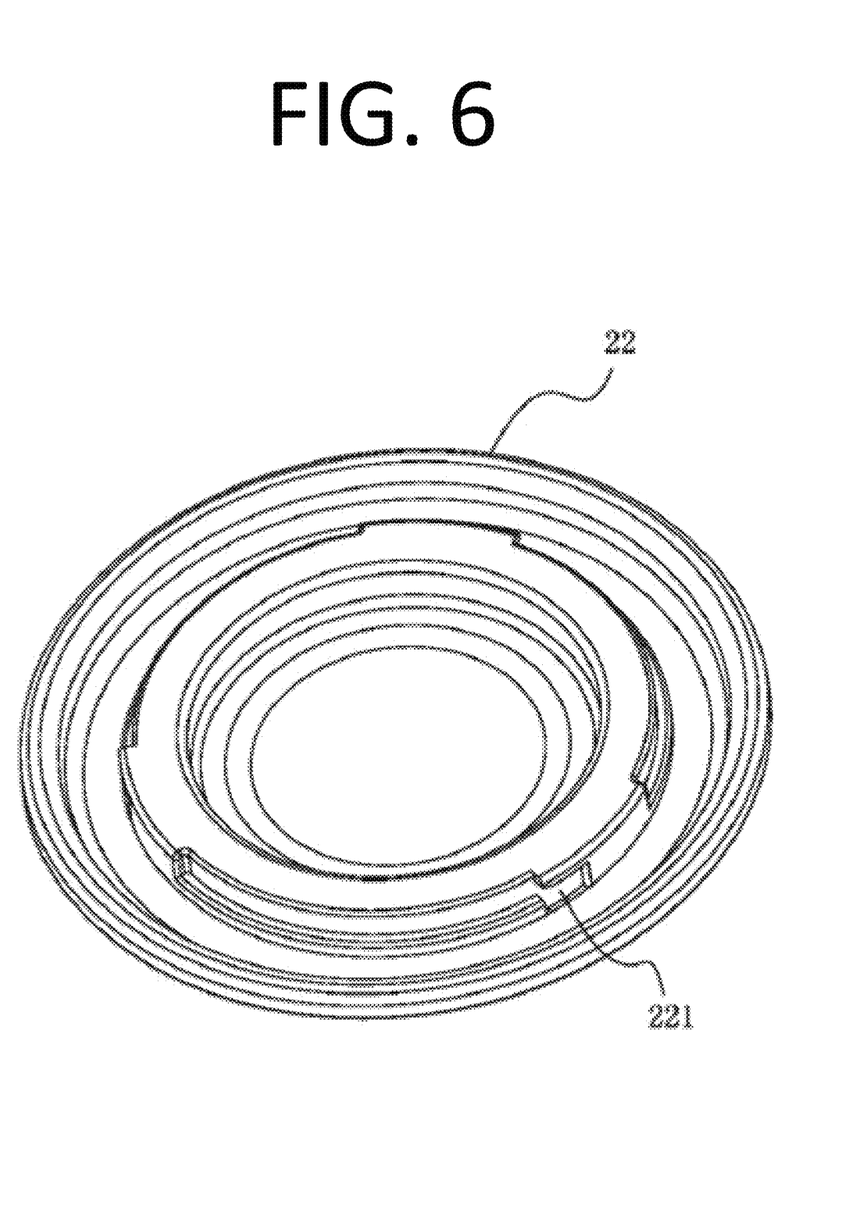
FIG. 6 is a perspective view of a turnplate, according to an embodiment of the present invention.
Figure 7:
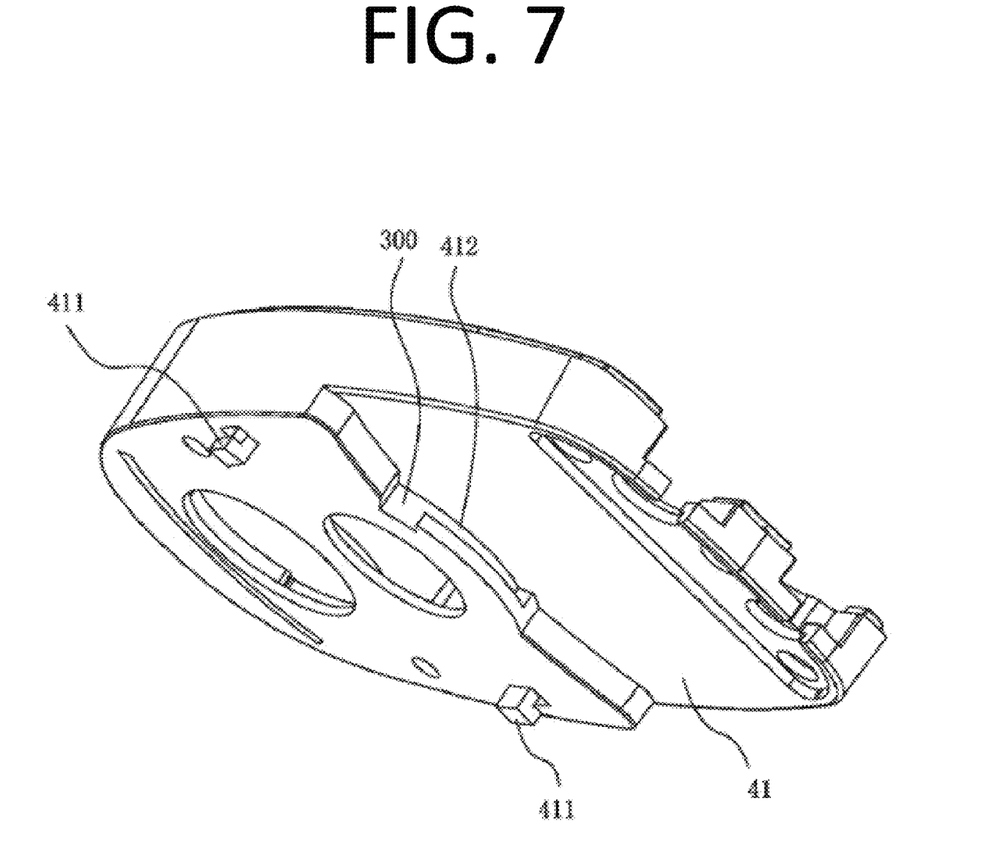
FIG. 7 is a perspective view of a bottom shell of a transmission case, according to an embodiment of the present invention.
Figure 8A:
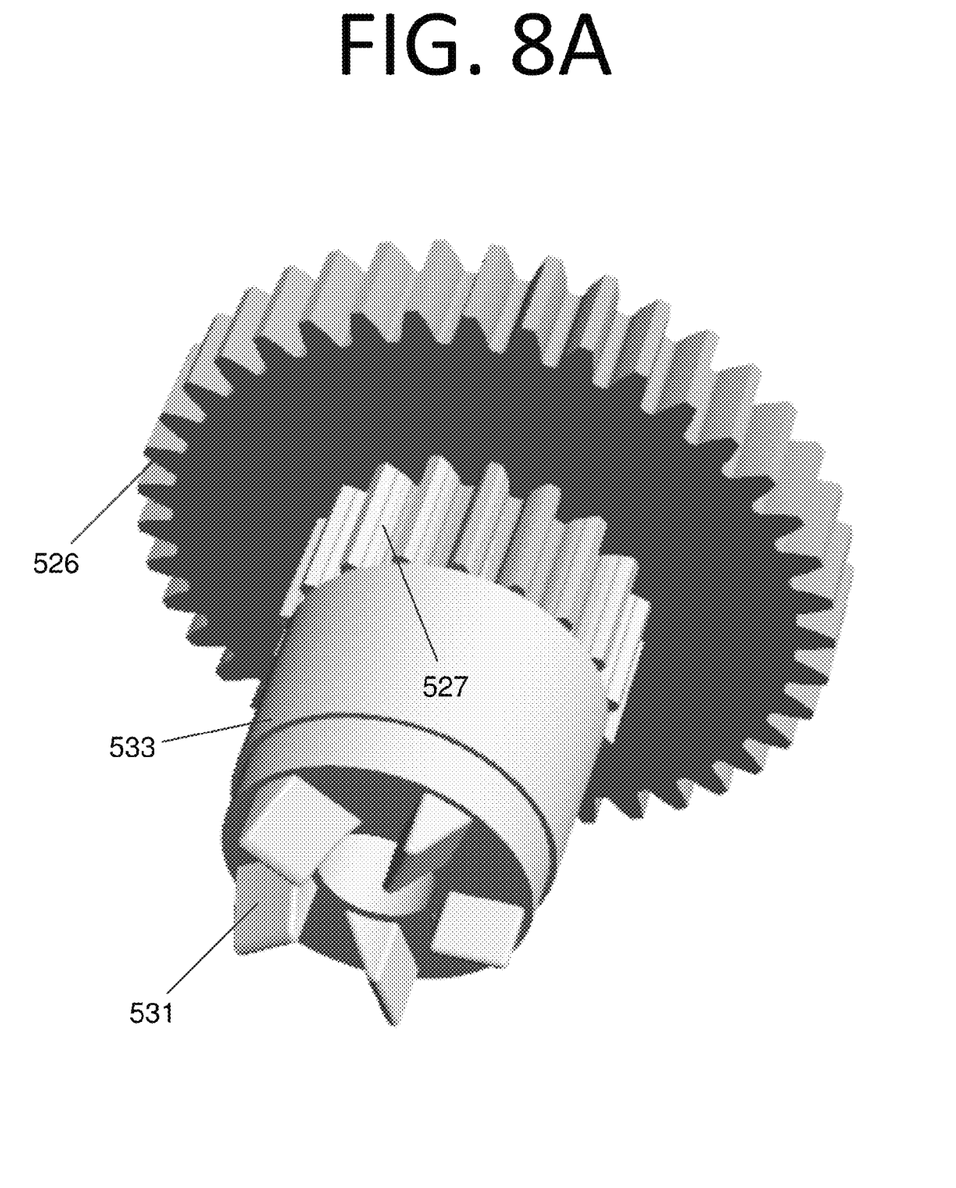
FIG. 8A is a bottom perspective view of a solid model rendering illustrating an assembly of a gear and a fixed gear that rotate about a rotation shaft, according to an embodiment of the present invention.
Figure 8B:
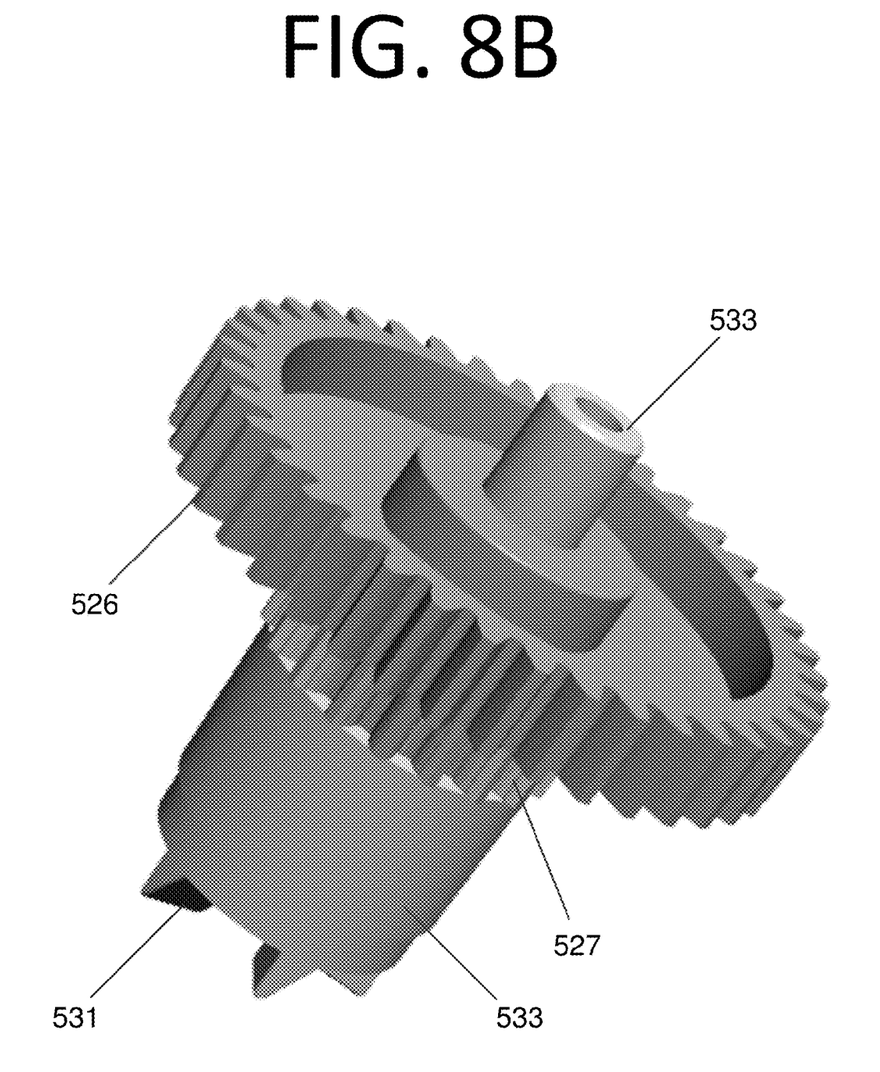
FIG. 8B is a top perspective view of the solid model rendering, according to an embodiment of the present invention.
Figure 8C:
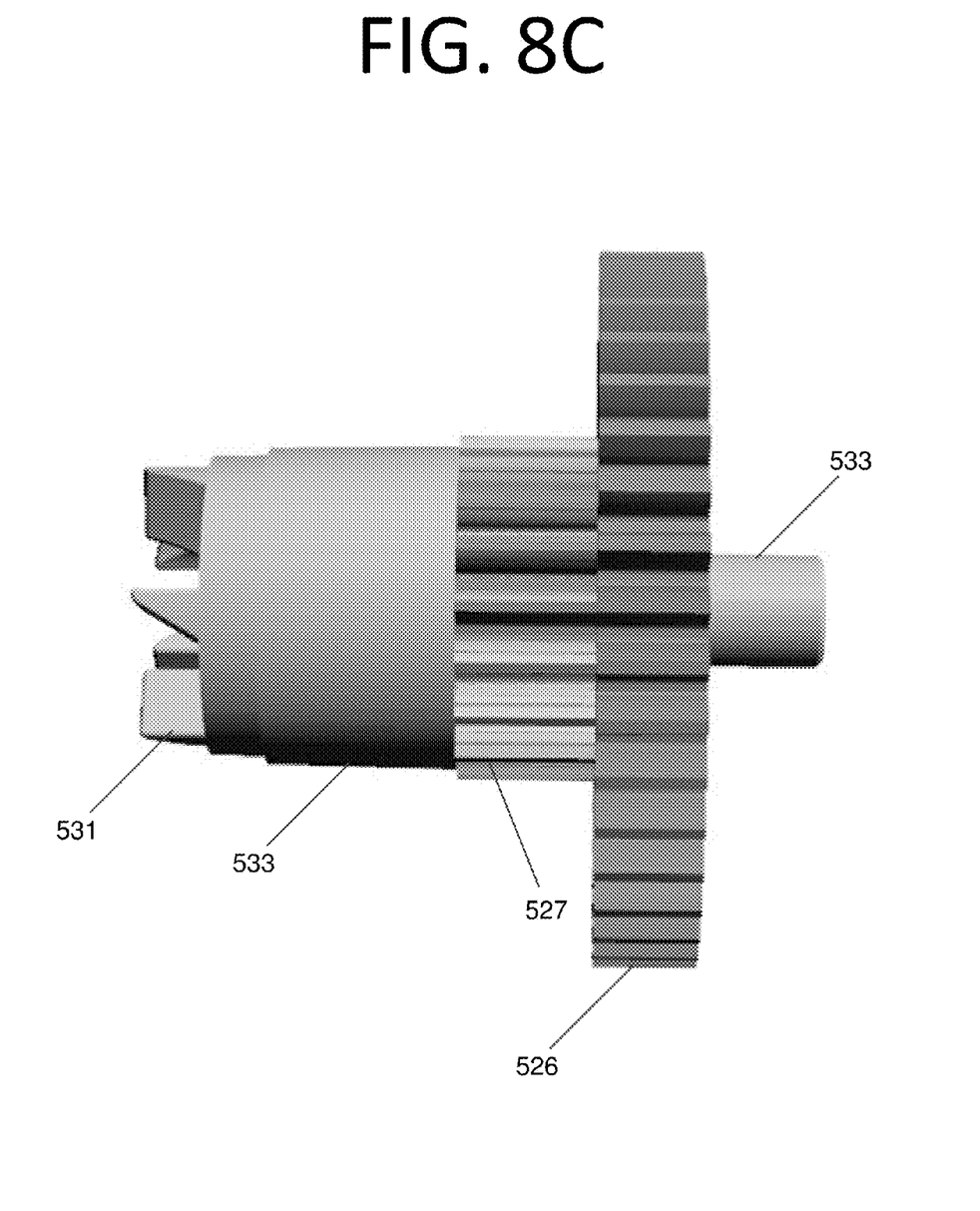
FIG. 8C is a side view of the solid model rendering, according to an embodiment of the present invention.
Figure 8D:
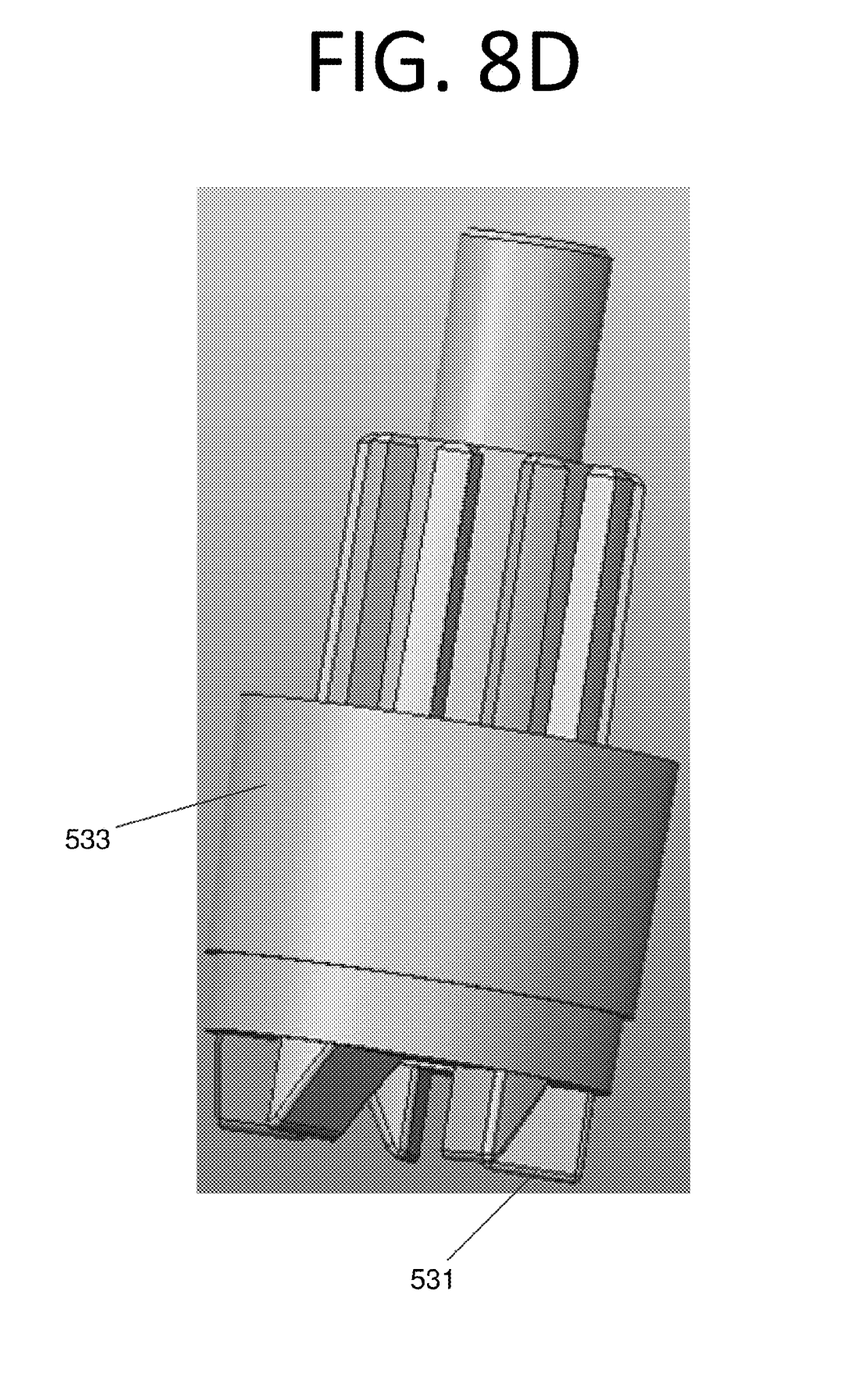
FIG. 8D is a perspective view illustrating a rotation shaft, according to an embodiment of the present invention.

Referring to FIGS. 1 to 7, a food processing machine capable of omnibearing stirring may include an L-shaped machine body 1 that may be integrally formed or be composed of a base and a machine body support. The L-shaped machine body 1 is provided with a rotatable cup 21 at the lower end, and is pivotally mounted with an opening-and-closing arm 3 capable of up and down rotation at the upper end. The opening-and-closing arm 3 is mounted with a built-in motor 500 and a machine head 6 capable of left and right oscillation relative to the opening-and-closing arm 3. One end of the machine head 6 is provided with a rotating member 7 driven by the motor 500 and extending into the cup 21 for stirring food. The rotating member 7 may be an egg breaking rod or a flour mixing rod, and is preferably removably mounted on the machine head 6 so as to facilitate user selection of different rotating members 7 to be mounted on the machine head 6 as needed.

In order to improve the stirring efficiency, two rotating members 7 are provided. An output shaft of the motor 500 is connected with a worm 511, and two ends of the worm 511 are connected with worm wheels 512 that are connected with the rotating members 7. The machine head 6 is mounted on the opening-and-closing arm 3 by a transmission case 4 that is provided with a first transmission mechanism driven by the motor 500 in its interior. The first transmission mechanism includes an oscillating gear 528 and a fixed gear 527 in engagement with the oscillating gear 528. A rotation shaft of the fixed gear 527 is removably connected with a transmission shaft 540 at the lower end, and the lower end of the transmission shaft 540 is fixed on the L-shaped machine body 1. A turnplate 22, which is brought into rotation by the transmission shaft 540 via a second transmission mechanism, is connected below the cup 21, and the turnplate 22 is rotatably mounted on the L-shaped machine body 1. The second transmission mechanism is arranged in the L-shaped machine body 1. A rotation shaft of the oscillating gear 528 is secured on the transmission case 4 at both ends, and a lower end face of the oscillating gear 528 is eccentrically provided with a bump 5281. An upper end of the opening-and-closing arm 3 is provided with a cover plate 31 having a linear groove 311. The bump 5281 extends out of the transmission case 4 and cooperates with the linear groove 311 so as to allow the oscillating gear 528 to drive the transmission case 4 to oscillate left and right around the fixed gear 527.

According to this embodiment, the rotating member 7 is driven by the motor 500 in the machine head 6, and the first transmission mechanism is driven by the motor 500 to rotate the fixed gear 527 and the oscillating gear 528 that are engaged with each other. As the rotation shaft of the fixed gear 527 is connected with the L-shaped machine body 1 via the transmission shaft 540, the oscillating gear 528 revolves around the fixed gear 527, and as the bump 5281 on the oscillating gear 528 is guided and constrained by the linear groove 311 in the opening-and-closing arm 3, the transmission case 4 is brought into left and right oscillation relative to the opening-and-closing arm 3 by the rotation shaft of the oscillating gear 528. This causes the machine head 6 mounted on the transmission case 4 to oscillate left and right relative to the opening-and-closing arm 3, and enables oscillation of the rotating member 7.

The turnplate 22 may be brought into rotation by the transmission shaft 540 via the second transmission mechanism, allowing the cup 21 connected to the turnplate 22 to rotate. According to this embodiment, simultaneous rotation of the rotating member 7, oscillation of the machine head 6, and rotation of the cup 21 may be achieved by one motor 500. The food processing machine of this embodiment is relatively small in size and simple to control, and the rotating member 7 is able to perform omnibearing stirring of food in the cup 21 effectively. The first transmission mechanism and the second transmission mechanism are positioned at the upper and lower ends of the food processing machine, respectively. The transmission mechanism is effective in design, avoiding the problem that the machine is top-heavy as the transmission mechanism is centralized at the upper part of the machine. The food processor also has good stability.

The first transmission mechanism further includes a transmission component arranged between the rotating member 7 and the fixed gear 527 for power transmission. The transmission component and the oscillating gear 528 are arranged at two ends of the fixed gear 527 respectively, allowing the center of gravity to be located near the cup 21 so that the stability is even further improved. An oscillating arm, i.e., a distance between an oscillation center to the rotating member 7, is relatively short. Thus, the rotating member 7 may withstand greater forces. The transmission component may be a gear transmission mechanism, a belt transmission mechanism, or a chain transmission mechanism in some embodiments. In this embodiment, in order to make the first transmission mechanism more structurally compact and smaller in size, the transmission component is a gear transmission mechanism. A drive gear 521 is arranged on the rotating member 7, and the transmission component is provided with a gear 522, which is relatively large, in engagement with the drive gear 521.

More specifically, the transmission component and the drive gear 521 constitute a four-stage speed reduction structure, and the transmission component further includes a pinion gear 1523 formed integrally with the gear 522. The pinion gear 1523 is engagingly connected with a gear 524, which is relatively large and is provided with a pinion gear 525 formed integrally therewith at one end. The pinion gear 525 is connected so as to engage with a gear 526, which is also relatively large and formed integrally with the fixed gear 527. The number of teeth of the fixed gear 527 is smaller than that of the oscillating gear 528 so as to form a speed reduction structure.

The second transmission mechanism in some embodiments is a gear transmission mechanism, a belt transmission mechanism, or a chain transmission mechanism. In this embodiment, in order to make the second transmission mechanism more structurally compact and smaller in size, the second transmission mechanism is a gear transmission mechanism, and includes a gear ring 553 positioned at the lower end of the turnplate 22 and formed integrally with the turnplate 22. More specifically, the second transmission mechanism is a two-stage speed reduction structure that further includes an input gear 551 connected with the transmission shaft 540 and an intermediate gear 552 engaged with the input gear 551 and the gear ring 553, respectively.

To facilitate up and down opening of the opening-and-closing arm 3, the rotation shaft of the fixed gear 527 is connected with the transmission shaft 540 via clutch teeth. In this embodiment, the lower end of the rotation shaft 533 of the fixed gear 527 is provided with upper clutch teeth 531 that penetrate out of the opening-and-closing arm 3, and the upper end of the transmission shaft 540 is provided with lower clutch teeth 532 meshed with the upper clutch teeth 531. When the rotating member 7 needs to be replaced, the rotation shaft 533 of the fixed gear 527 may disengage from the transmission shaft 540 by rotating the opening-and-closing arm 3, which is fast and convenient.

An oscillation guiding mechanism is arranged between the transmission case 4 and the cover plate 31, and includes an L-shaped sliding block and an arc-shaped sliding chute in sliding fit with the sliding block. The arc-shaped sliding chute is centered on the axis of the fixed gear 527 and is provided with an entering groove for ease of entering the sliding block at one end. When the transmission case 4 and the opening-and-closing arm 3 are assembled, the sliding block on the transmission case 4 is aligned with the entering groove of the arc-shaped sliding chute and inserted therein, and the transmission case 4 is rotated to allow the sliding block and the entering groove to be staggered.

During oscillation of the transmission case 4, as the sliding block slides on the arc-shaped sliding chute at positions staggered from the entering groove, the sliding block is prevented from being detached from the arc-shaped sliding chute. Therefore, in addition to serving as sliding guide for the oscillation of the transmission case 4, the sliding block also connects the transmission case 4 and the opening-and-closing arm 3, such that the transmission case 4 may not be detached from the opening-and-closing arm 3 during operation. In this embodiment, three sets of oscillation guiding mechanisms are provided to improve safety and prevent the transmission case 4 from being detached from the opening-and-closing arm 3. The arc-shaped sliding chute includes two transverse arc-shaped sliding chutes 312 arranged in the upper end face of the cover plate 31 and a longitudinal arc-shaped sliding chute 412 arranged in side of a bottom shell 41 of the transmission case 4. The two transverse arc-shaped sliding chutes 312 are disposed at two sides of the fixed gear 527, respectively and are concentric with the fixed gear 527. The longitudinal arc-shaped sliding chute 412 is concentric with the fixed gear 527. The sliding block includes two first sliding blocks 411 arranged on the bottom shell 41 of the transmission case 4 and a second sliding block 313 arranged on the upper end face of the cover plate 31. The two first sliding blocks 411 are in sliding fit with the two transverse arc-shaped sliding chute 312, respectively. The second sliding block 313 is in sliding fit with the longitudinal arc-shaped sliding chute 412. The two transverse arc-shaped sliding chutes 312 and the longitudinal arc-shaped sliding chute 412 are provided with the entering groove at one end.

In order to simplify the structure and facilitate the mounting of the cup 21 on the turnplate 22, the lower end of the cup 21 is provided with a bottom edge 211 that is provided with a convex buckle 212 on the inner side thereof, and the turnplate 22 is provided with a rotating groove 221 rotatingly buckled with the convex buckle 212. More specifically, three convex buckles 212 are provided around the center of the cup 21 in uniform distribution, and the rotating groove 221 is provided with an opening. When mounted, the convex buckles 212 are aligned with the opening of the rotating groove 221 and inserted therein, then the cup 21 is rotated to the end that the convex buckles 212 and the rotating groove 221 are away from the opening. When demounted, the cup 21 is reversely rotated to the end of the rotating groove 221 having the opening and then disengaged. Both the mounting and demounting processes are convenient and fast.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A food processing machine configured for omnibearing stirring, comprising:
    an L-shaped machine body, wherein a rotatable cup is arranged at a lower end of the L-shaped machine body;
    an opening-and-closing arm configured for up-and-down rotation, the opening-and-closing arm pivotally mounted at an upper end of the L-shaped machine body, the opening-and-closing arm also mounted with a built-in motor;
    a machine head configured for left and right oscillation relative to the opening-and-closing arm, wherein one end of the machine head is provided with a rotating member driven by the built-in motor and extending into the cup to stir food; and
    a transmission case that is internally provided with a first transmission mechanism driven by the built-in motor, the first transmission mechanism comprising an oscillating gear and a fixed gear in engagement with the oscillating gear, wherein
    a rotation shaft of the fixed gear removably connected with a transmission shaft at a lower end of the transmission shaft, the lower end of the transmission shaft fixed on the L-shaped machine body,
    a turnplate is brought into rotation by the transmission shaft via a second transmission mechanism connected below the cup,
    the second transmission mechanism is arranged in the L-shaped machine body, a rotation shaft of the oscillating gear is secured on the transmission case at two ends,
    a lower end face of the oscillating gear is eccentrically provided with a bump,
    an upper end of the opening-and-closing arm is provided with a cover plate having a linear groove,
    the bump extends out from the transmission case and cooperates with the linear groove to allow the oscillating gear to drive the transmission case to oscillate left and right around the fixed gear, and
    the machine head mounted on the opening-and-closing arm by the transmission case.

2. The food processing machine capable of omnibearing stirring according to claim 1, wherein the first transmission mechanism further comprises a transmission component arranged between the rotating member and the fixed gear for power transmission, and the transmission component and the oscillating gear are arranged at two sides of the fixed gear, respectively.

3. The food processing machine capable of omnibearing stirring according to claim 2, wherein the transmission component comprises a gear transmission mechanism, a belt transmission mechanism, or a chain transmission mechanism.

4. The food processing machine capable of omnibearing stirring according to claim 3, wherein the transmission component comprises a gear transmission mechanism, a drive gear is arranged on the rotating member, and the transmission component is provided with a gear in engagement with the drive gear.

5. The food processing machine capable of omnibearing stirring according to claim 1, wherein the second transmission mechanism comprises a gear transmission mechanism, a belt transmission mechanism, or a chain transmission mechanism.

6. The food processing machine capable of omnibearing stirring according to claim 5, wherein the second transmission mechanism comprises a gear transmission mechanism comprising a gear ring located at a lower end of the turnplate and formed integrally therewith.

7. The food processing machine capable of omnibearing stirring according to claim 1, wherein the rotation shaft of the fixed gear is connected with the transmission shaft via clutch teeth.

8. The food processing machine capable of omnibearing stirring according to claim 1, wherein an oscillation guiding mechanism is arranged between the transmission case and the cover plate, and the oscillation guiding mechanism comprises an L-shaped sliding block and an arc-shaped sliding chute in sliding fit with the sliding block, the arc-shaped sliding chute centered on an axis of the fixed gear and provided with an entering groove for ease of entering the sliding block at one end.

9. The food processing machine capable of omnibearing stirring according to claim 8, wherein three sets of oscillation guiding mechanisms are provided, and the arc-shaped sliding chute comprises two transverse arc-shaped sliding chutes arranged on an upper end face of the cover plate and a longitudinal arc-shaped sliding chute arranged on a side of a bottom shell of the transmission case, the two transverse arc-shaped sliding chutes positioned at two different sides of the fixed gear, respectively, the sliding block comprising two first sliding blocks positioned on the bottom shell of the transmission case and a second sliding block positioned on the upper end face of the cover plate, the two first sliding blocks in sliding fit with the two transverse arc-shaped sliding chutes, respectively, and the second sliding block in sliding fit with the longitudinal arc-shaped sliding chute.

10. The food processing machine capable of omnibearing stirring according to claim 1, wherein two rotating members are provided, an output shaft of the motor is connected with a worm, and two ends of the worm are connected with worm wheels that are connected with the two rotating members.

11. The food processing machine capable of omnibearing stirring according to claim 1, wherein the cup is provided with a bottom edge at its lower end, an inner side of the bottom edge is provided with a convex buckle, and the turnplate is provided with a rotating groove rotatingly buckled with the convex buckle.

\* \* \* \* \*